(12) United States Patent
Gustavsson et al.

(10) Patent No.: US 7,205,842 B2
(45) Date of Patent: Apr. 17, 2007

(54) CONTINUOUS ALTERNATING CLOSED-OPEN LOOP POWER CONTROL

(75) Inventors: Björn Gustavsson, Lund (SE); Martin Akerberg, Lund (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 96 days.

(21) Appl. No.: 11/177,810

(22) Filed: Jul. 8, 2005

(65) Prior Publication Data

US 2006/0152285 A1 Jul. 13, 2006

Related U.S. Application Data

(60) Provisional application No. 60/643,624, filed on Jan. 13, 2005.

(51) Int. Cl.
*H03G 3/10* (2006.01)

(52) U.S. Cl. .................................. 330/279; 330/285

(58) Field of Classification Search ................ 330/279, 330/285, 256, 1–9, 136
See application file for complete search history.

(56) References Cited

U.S. PATENT DOCUMENTS

| | | | |
|---|---|---|---|
| 6,236,863 B1 | 5/2001 | Waldroup et al. | |
| 6,577,852 B1 * | 6/2003 | Iwata et al. | 455/240.1 |
| 6,600,772 B1 | 7/2003 | Zeira et al. | |
| 6,603,797 B1 | 8/2003 | Zeira et al. | |
| 6,697,634 B1 | 2/2004 | Hayashi | |
| 6,788,138 B2 * | 9/2004 | Suzuki | 330/129 |
| 6,829,226 B1 | 12/2004 | Apostolides et al. | |
| 7,034,617 B2 * | 4/2006 | Takahashi et al. | 330/279 |
| 2004/0240582 A1 | 12/2004 | Wenzel et al. | |

FOREIGN PATENT DOCUMENTS

| | | |
|---|---|---|
| EP | 0682419 | 11/1995 |
| EP | 1215816 | 6/2002 |
| EP | 1343254 | 2/2003 |

* cited by examiner

*Primary Examiner*—Henry Choe
(74) *Attorney, Agent, or Firm*—Coat & Bennett, P.L.L.C.

(57) ABSTRACT

The present invention comprises a method and apparatus for continuously, controlling a gain of an amplifier circuit while switching between open-loop and closed-loop power control. A control circuit controls the gain of the amplifier circuit during open-loop and closed-loop power control modes based on selected references. Before the switch from open-loop to closed-loop power control, the control circuit determines a closed-loop reference based on a power measured at the amplifier circuit output before the switch. After the switch, the control circuit controls the gain of the amplifier circuit based on the determined closed-loop reference. Before switching from closed-loop to open-loop power control, the control circuit generates a difference between a current open-loop reference and a previous open-loop reference. After the switch, the control circuit controls the gain of the amplifier circuit based on an open-loop gain control signal generated by applying the difference to a previous closed-loop gain control signal.

33 Claims, 7 Drawing Sheets

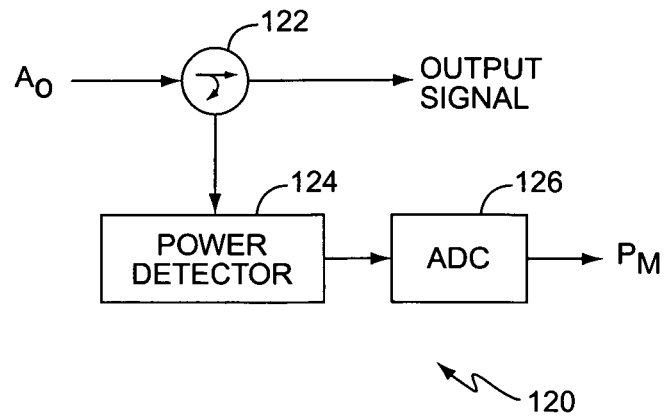
*FIG. 3*
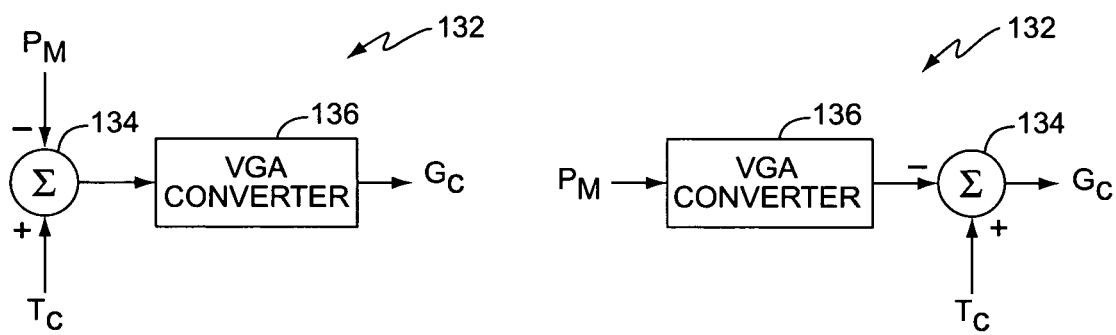
*FIG. 4A*   *FIG. 4B*
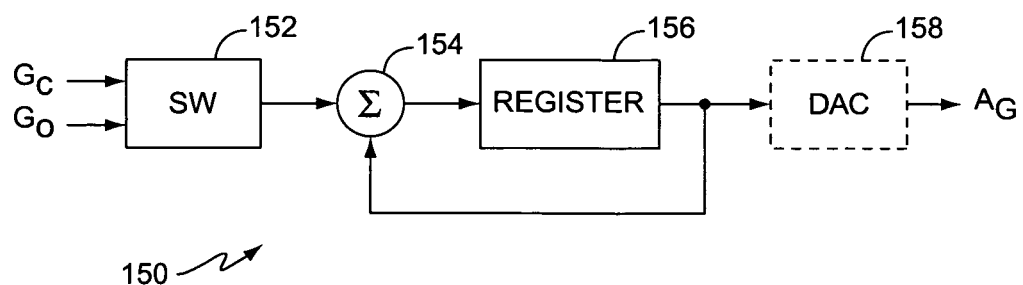
*FIG. 5*

CONTINUOUS ALTERNATING CLOSED-OPEN LOOP POWER CONTROL

This application claims priority to Provisional U.S. Patent Application 60/643,624 filed 13 Jan. 2005, which is incorporated herein by reference.

BACKGROUND OF THE INVENTION

The present invention generally relates to power control for wireless transmitters, and more particularly to variable gain amplifier circuits for wireless transmitters.

Wireless communication systems use power control to reduce interference and increase system capacity while maintaining minimum signal quality standards. The capacity of wireless communication systems, i.e., WCDMA (Wideband Code Division Multiple Access) systems, relies heavily on the accurate implementation of uplink power control. Many wireless communication standards, such as 3GPP TS 25.101, include specific requirements for transmit power control accuracy within the wireless communication device. These device requirements include both absolute and relative accuracy transmit power requirements. The absolute requirements define a lower and an upper transmit power limit relative to a nominal transmit power. The relative requirements define minimum and maximum transmit power differences between two transmitted time slots, not necessarily adjacent time slots, as well as an aggregated transmit power difference over several time slots.

Closed-loop power control represents one method for controlling the transmit power within the wireless communication device to comply with the relative and absolute transmit power requirements. As used herein, closed-loop power control refers to feedback power control implemented within the wireless communication device. A closed-loop power control system determines the error between a measured transmit power and a desired transmit power. Based on this error, the closed-loop power control system adjusts the transmit power by adjusting a gain of a variable gain amplifier within a wireless transmitter of the wireless communication device.

Because power detectors have a limited dynamic range, wireless communication devices may be unable to accurately measure low transmit powers, causing closed-loop power control to become unreliable at low transmit powers. To avoid this, the wireless communication device may alternatively use open-loop power control. As used herein, open-loop power control refers to power control implemented within the wireless communication device that adjusts the transmit power, responsive to a power control command, based on known device operation parameters and/or environmental conditions. Open-loop power control enables compliance with the relative power requirements. However, because open-loop power control does not include any means for verifying the accuracy of the transmit power, open-loop power control may generate transmit powers that drift away from the desired transmit power, and therefore, violate the absolute power requirements.

Another solution may use a combination of closed-loop and open-loop power control. When a measured transmit power meets or exceeds a predetermined threshold, the wireless communication device implements the closed-loop power control. Otherwise, the wireless communication device implements open-loop power control.

It will be appreciated that this combination solution generally addresses the above-discussed issues associated with pure closed-loop and pure open-loop power control systems. However, because the open-loop transmit power is relatively undefined before the switch to closed-loop, the power step that occurs when switching from open-loop to closed-loop power control will also be relatively undefined, which may cause a discontinuity to occur during the transition. Further, because a gain control signal during closed-loop power control may significantly differ from the gain control signal generated after switching from closed-loop to open-loop power control, a discontinuity may also occur when switching from closed-loop to open-loop power control. These discontinuities may cause the power step between adjacent time slots to exceed the relative transmit power requirements during transitions between open-loop and closed-loop power control. Therefore, transitions between open-loop and closed-loop power control must be carefully controlled to ensure compliance with the relative transmit power requirements.

BRIEF SUMMARY OF THE INVENTION

The present invention comprises a method and apparatus for continuously controlling a gain of an amplifier circuit while switching between open-loop and closed-loop power control. According to one exemplary embodiment, an amplification system comprises an amplifier circuit, a detection circuit, and a power control circuit. The power control circuit controls the gain of a variable gain amplifier within the amplifier circuit during both open-loop and closed-loop power control modes based on open-loop and closed-loop references, respectively. The detection circuit measures an output power of the amplifier circuit. Based on the output power measured before the switch from open-loop to closed-loop power control, the power control circuit determines a closed-loop reference. After the switch from open-loop to closed-loop power control, the power control circuit controls the gain of the variable gain amplifier based on the determined closed-loop reference.

According to another exemplary embodiment, the power control circuit controls the gain of the variable gain amplifier while switching from closed-loop to open-loop power control based on an open-loop gain control signal. For this embodiment, the power control circuit generates a difference between a current open-loop reference and a previous open-loop reference. After switching from closed-loop to open-loop power control, the power control circuit applies the difference to a previous closed-loop gain control signal to generate a new open-loop gain control signal.

BRIEF DESCRIPTION OF THE DRAWINGS

FIG. 3 illustrates a block diagram of one exemplary detection circuit for the amplification system of FIG. 1.

FIGS. 4A and 4B illustrate block diagrams of two exemplary closed-loop controllers for the amplification system of FIG. 1.

FIG. 5 illustrates a block diagram of one exemplary gain controller for the amplification system of FIG. 1.

DETAILED DESCRIPTION OF THE INVENTION

Figure 1:
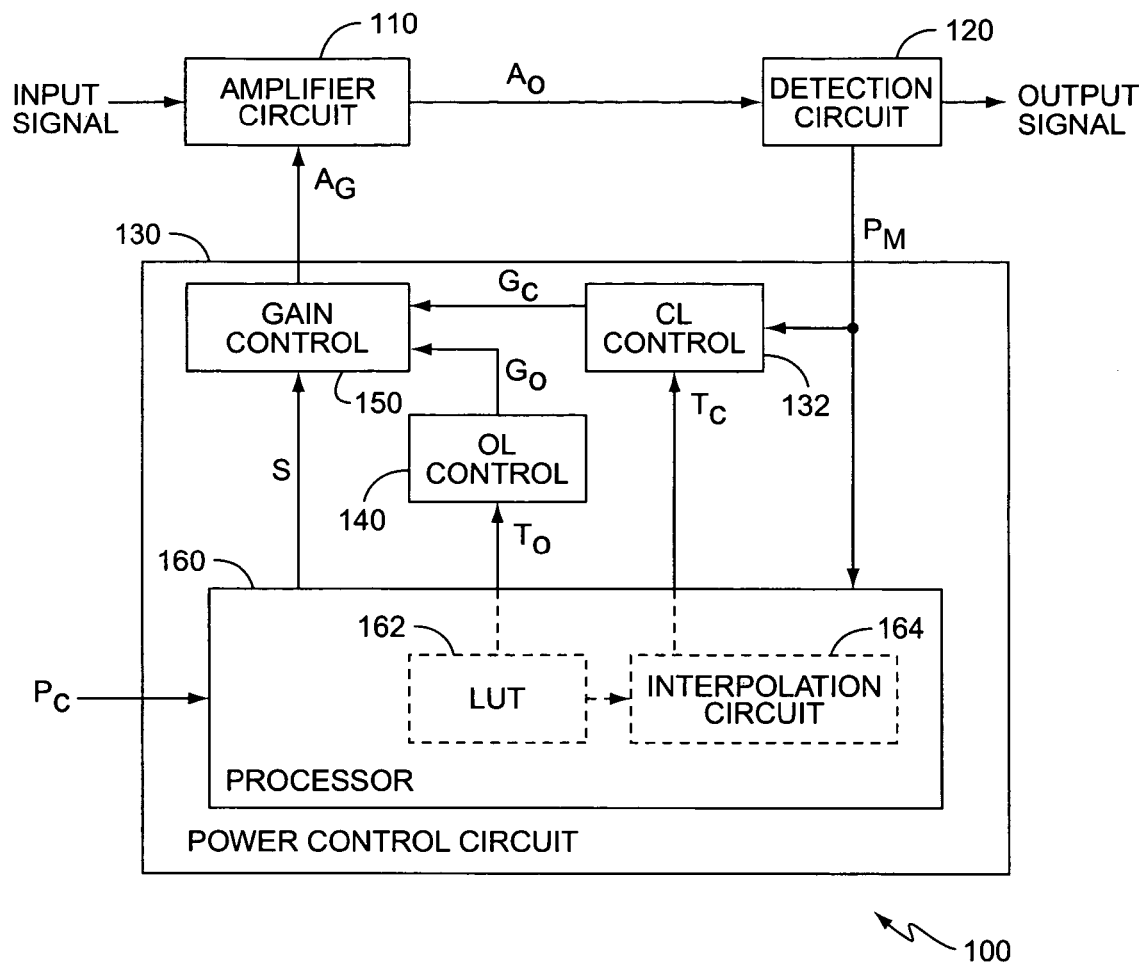
FIG. 1 illustrates a block diagram of one exemplary amplification system according to the present invention.

FIG. 1 illustrates a block diagram of an amplification system 100 according to one exemplary embodiment of the present invention. The following describes the invention in terms of an amplification system 100 in a wireless transmitter of a wireless communication device, such as a cellular telephone, satellite telephone, personal communication services (PCS) devices, personal data assistants (PDAs), palm top computers, pagers, etc. However, it will be appreciated that the present invention applies to any amplification system 100 within any electronic device requiring a controlled output power level. Further, while the following describes the invention in terms of a wireless communication device within a WCDMA system, those skilled in the art will appreciate that the present invention also applies to other wireless communication systems, such as Time-Division Multiple Access (TDMA) systems, Orthogonal Frequency Division Multiplexing (OFDM) systems, etc.

Amplification system 100 controls the power level of an output signal, such as a WCDMA transmission signal. Power control commands may comprise a differential power control command or absolute power control command. In differential power control, the wireless communication device steps power up and down by fixed steps responsive to up and down commands. In one exemplary embodiment, a base station in communication with the wireless communication device sends the power control commands to the wireless communication device. Alternatively, a processor within the wireless communication device may generate the power control commands. Because the generation and/or reception of power control commands is well known, it will not be discussed further herein.

According to one exemplary embodiment, amplification system 100 comprises an amplifier circuit 110, a detection circuit 120, and a digital power control circuit 130. Amplifier circuit 110 amplifies an input signal responsive to a gain control signal $A_G$ provided by power control circuit 130 to achieve an amplified signal $A_o$ at a desired power level. Detection circuit 120 extracts a small portion of the amplified signal $A_o$ measures the power of the extracted portion, and provides the measured power $P_M$ to power control circuit 130. In addition, detection circuit 120 provides the output signal for amplifier system 100. Power control circuit 130 generates the gain control signal $A_G$ responsive to power control commands and/or the measured power $P_M$ from the detection circuit 120.

Figure 2:
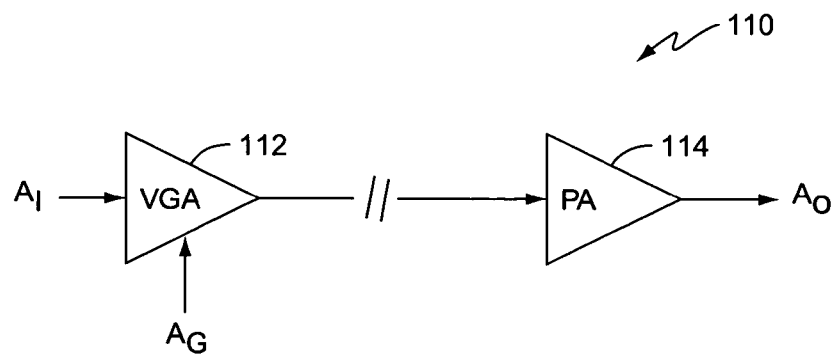
FIG. 2 illustrates a block diagram of one exemplary amplifier circuit for the amplification system of FIG. 1.

As shown in FIG. 2, amplifier circuit 110 comprises at least one variable gain amplifier (VGA) 112 for amplifying the input signal to obtain an output signal at a desired power level. Broadly, the gain of variable gain amplifier 112 varies responsive to the gain control signal $A_G$ provided by the power control circuit 130. In addition, amplifier circuit 110 may further comprise one or more additional amplifiers 114 to assist the variable gain amplifier 112 in amplifying the input signal to an output signal at a desired output power level.

Detection circuit 120, shown in FIG. 3, measures the power level of the output signal and provides a digitized version of the measured value $P_M$ to power control circuit 130. In one exemplary embodiment, detection circuit 120 comprises a splitter 122, power detector 124, and analog-to-digital converter (ADC) 126. Splitter 122 extracts a small portion from the amplified signal $A_o$ and provides the extracted portion to power detector 124. Power detector 124 measures the power of the extracted portion, and ADC 126 converts the analog measurement to the digital power measurement $P_M$. Power detector 124 may comprise any known power detection circuit. Because power detectors are well known, they are not discussed further herein.

Power control circuit 130 generates the gain control signal $A_G$ for amplifier circuit 110 responsive to power control commands and/or the measured power $P_M$ during open-loop and closed-loop power control. In addition, according to the present invention, power control circuit 130 adjusts the gain control signal $A_G$ in such a way that transitions between open-loop and closed-loop power control generate no relative power deviations.

One exemplary power control circuit 130 includes closed-loop controller 132, open-loop controller 140, gain controller 150, and processor 160, as shown in FIG. 1. Processor 160 generates a selection signal for controlling gain control 150, as discussed further below. In addition, processor 160 generates open-loop and closed-loop references responsive to power control commands $P_c$ and/or the measured power $P_M$. During closed-loop power control, closed-loop controller 132 generates a closed-loop gain adjustment value $G_c$ based on the closed-loop reference $T_c$ and the measured power $P_M$. During open-loop power control, open-loop controller 140 generates an open-loop gain adjustment value $G_o$ based on the open-loop reference $T_o$, which is selected based on the power control command $P_c$. Gain controller 150 generates the gain control signal $A_G$ based a selected one of the closed-loop and open-loop gain adjustment values.

Processor 160 includes a look-up table 162 and an interpolation circuit 164. While FIG. 1 illustrates that look-up table 162 and interpolation circuit 164 are part of processor 160, those skilled in the art will appreciate that one or both may be implemented separately from processor 160.

Look-up table 162 stores a plurality of open-loop and closed-loop references in an ordered list corresponding to a plurality of power control levels. According to one embodiment, the stored open-loop references may comprise reference VGA control signals, and the stored closed-loop references may comprise target power levels. Responsive to a power control command $P_c$, processor 160 executes the look-up table 162 to select the closed-loop and open-loop references. Power control commands $P_c$ may be generated according to any known means. For example, power control commands $P_c$ may be computed by a wireless communication device based on measured pilot signal strengths.

Interpolation circuit 164 may modify the closed-loop reference $T_c$ to provide finer resolution than available with look-up table 162 alone. As a result, modifying the closed-loop reference $T_c$ when transitioning from open-loop to closed-loop power control may avoid the large steps that cause the undesirable discontinuities discussed above. Operation of the interpolation circuit 164 is discussed further below.

FIG. 4A illustrates one exemplary embodiment for closed-loop controller 132 that generates the closed-loop gain adjustment value based on a difference between the measured output power $P_M$ and the closed-loop reference $T_c$. Closed-loop controller 132 includes combiner 134 and VGA converter 136. Combiner 134 determines a power difference between the measured power $P_M$ and the closed-loop reference $T_c$, during normal operation, where the closed-loop reference $T_c$ comprises a digitized target power level selected from the look-up table 162 based on the power control command. Converter 136 maps the power difference to a digitized VGA value to generate the closed-loop gain adjustment value $G_c$.

While the embodiment illustrated by FIG. 4A shows VGA converter 136 following combiner 134, VGA converter 136 may alternatively precede combiner 134, as shown in FIG. 4B. In this embodiment, VGA converter 136 maps the digitized measured power $P_M$ to a digitized VGA value. Combiner 134 determines a difference between the digitized VGA value of $P_M$ and the closed-loop reference $T_c$ to generate the closed-loop gain adjustment value $G_c$. In this embodiment, the closed-loop reference $T_c$ during normal closed-loop operations comprises a digitized target VGA value selected from look-up table 162 based on the power control command.

Closed-loop controller 132 provides the closed-loop gain adjustment value $G_c$, which represents a digitized VGA adjustment value, to gain controller 150. It will be appreciated that while the closed-loop reference $T_c$ selected from look-up table 162 only changes responsive to step up or step down power control commands, the closed-loop gain adjustment value $G_c$ changes whenever the measured power $P_M$ changes relative to the selected closed-loop reference $T_c$.

Open-loop controller 140 generates an open-loop gain adjustment value $G_o$ based on the selected open-loop reference $T_o$, and provides $G_o$ to gain controller 150. In general, processor 160 selects the open-loop reference $T_o$ from look-up table 162 based on the power control command. Therefore, as with the closed-loop reference $T_c$, the open-loop reference $T_o$ changes responsive to step up or step down power control commands. However, unlike the closed-loop gain adjustment value $G_c$, which may change independent of the power control commands, the open-loop gain adjustment value $G_o$ only changes responsive to a change to the power control command, and therefore, only changes responsive to a change to the open-loop reference $T_o$.

As discussed above, power control circuit 130 adjusts the gain of variable gain amplifier 112 to meet transmit power requirements. To that end, gain controller 150 selects one of the closed-loop and open-loop gain adjustment values and adjusts a gain control signal $A_G$ based on the selected gain adjustment value. According to one exemplary embodiment, gain controller 150 comprises switch 152, combiner 154, and register 156, as shown in FIG. 5. Switch 152, which may comprise any known switch, including hardware switches, software switches, or any combination thereof, selects one of the closed-loop gain adjustment value $G_c$ and the open-loop gain adjustment value $G_o$ responsive to the selection signal S.

Processor 160 may generate the selection signal S responsive to the measured power $P_M$ provided by detection circuit 120. When $P_M$ meets or exceeds a predetermined threshold, processor 160 generates a selection signal S to instruct the gain controller 150 to select the closed-loop gain adjustment value $G_c$. When $P_M$ is less than the threshold, processor 160 generates a selection signal S to instruct the gain controller 150 to select the open-loop gain adjustment value $G_o$.

Alternatively, processor 160 may generate the selection signal S responsive to the current location of the selected reference within look-up table 162. When the reference is selected from a closed-loop section of look-up table 162, processor 160 generates a selection signal S to instruct the gain controller 150 to select the closed-loop gain adjustment value $G_c$. Alternatively, when the reference is selected from an open-loop section of look-up table 162, processor 160 generates a selection signal S to instruct the gain controller 150 to select the open-loop gain adjustment value $G_o$.

In one exemplary embodiment, processor 160 may use a combination of these techniques to select between the open-loop and closed-loop gain adjustment values. According to this embodiment, when the measured power $P_M$ meets or exceeds a predetermined threshold, processor 160 generates a selection signal S to instruct the gain controller 150 to select the closed-loop gain adjustment value $G_c$. However, when the reference is selected from an open-loop section of look-up table 162, processor 160 generates a selection signal S to instruct the gain controller 150 to select the open-loop gain adjustment value $G_o$.

After selecting one of the open-loop or closed-loop gain adjustment values, gain controller 150 generates a new gain control signal $A_G$ by adjusting a previous gain control signal $A_G$ stored in register 156 based on the selected gain adjustment value. According to one exemplary embodiment, combiner 154 combines the selected gain adjustment value with the previous gain control signal stored in register 156 to generate the new gain control signal. Register 156 then stores the new gain control signal for future use.

Gain controller 150 may supply this digital gain control signal $A_G$ directly to amplifier circuit 110 to control the gain of the variable gain amplifier 112. Alternatively, if the variable gain amplifier 112 requires an analog control signal, gain controller 150 may also include a digital-to-analog converter (DAC) 158 to convert the digital gain control signal $A_G$ to an analog gain control signal $A_G$ before supplying the analog gain control signal $A_G$ to amplifier circuit 110.

Closed-loop power control provides accurate power control when the power at the output of amplifier circuit 110 falls within the dynamic range of power detector 124. When the output power level falls outside this range, open-loop power control is more appropriate. However, as also discussed above, discontinuities may occur when switching between open-loop power control and closed-loop power control. As a result, the output power may violate the relative power requirements for the wireless communication device during transitions between open-loop and closed-loop power control.

Figure 6:
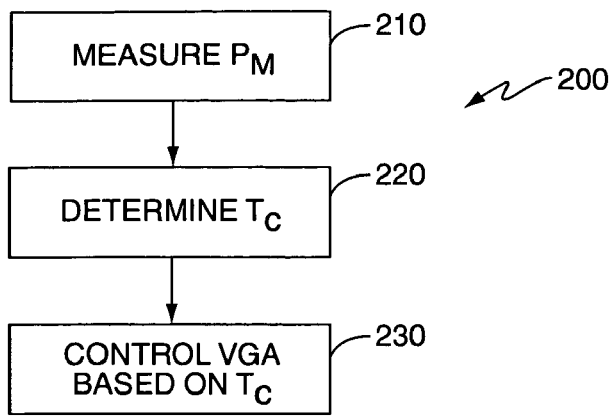
FIG. 6 illustrates a method of controlling the amplifier circuit according to one exemplary embodiment of the present invention.

FIG. 6 illustrates one exemplary procedure 200 for preventing large step changes in output signal power caused by the transitions from open-loop power control to closed-loop power control. Broadly, power control circuit 130 determines a closed-loop reference $T_c$ by finding an adjustment for the closed-loop reference $T_c(p)$ (block 220) in the LUT based on the power measured at the output of the amplifier circuit 110 (block 210) during open-loop power control. After the switch from open-loop to closed-loop power control, power control circuit 130 adjusts the gain control signal $A_G$ based on the determined closed-loop reference $T_c$ (block 230). In so doing, the present invention prevents large step changes in the transmit power during the transition from open-loop to closed-loop power control. The adjustment of the closed-loop reference is performed by the interpolation circuit 164.

Figure 7:
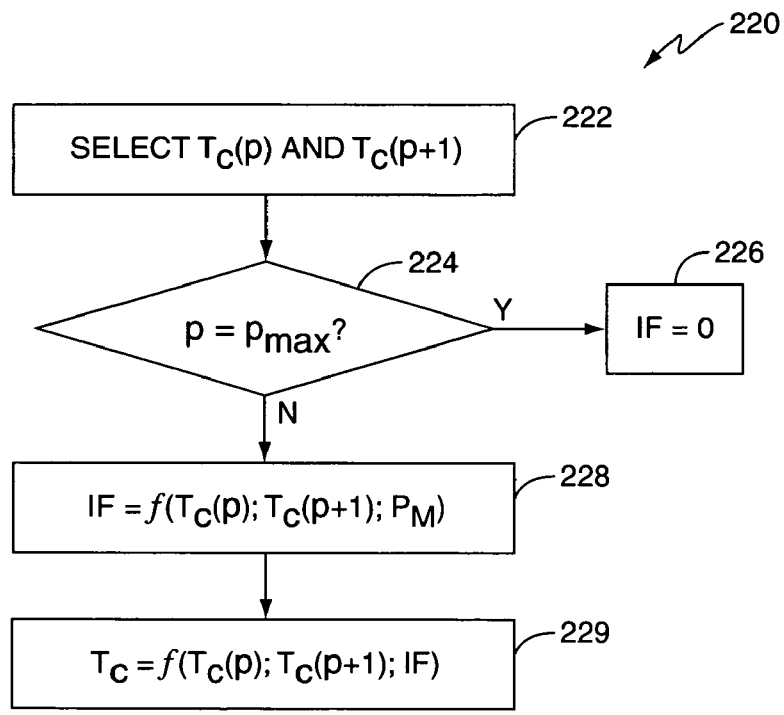
FIG. 7 illustrates a method of determining a closed-loop reference according to one exemplary embodiment of the present invention.

Interpolation circuit 164 determines the closed-loop reference $T_c$ by calculating an interpolation factor (IF) in IF circuit 167 based on the measured power $P_M$. Interpolation circuit 164 then applies the interpolation factor to a selected closed-loop reference. FIG. 7 illustrates one exemplary procedure 220 using this method. According to this method 220, interpolation circuit 164 selects the two closed-loop references in look-up table 162 that bracket the output power $P_M$ measured during open-loop power control (block 222). These two selected closed-loop references may be represented as $T_c(p)$ and $T_c(p+1)$, where p represents the location in look-up table 162, and $T_c(p+1)$ represents the larger closed-loop reference. If p equals a pre-defined maximum value (block 224), processor 160 sets the interpolation factor (IF) to zero (block 226) to prevent the closed-loop reference from exceeding the maximum value $T_c(p=max)$. This is true even during non-transition operations. However, if p is less than the maximum value, IF circuit 167 computes the interpolation factor as a function of the two selected closed-loop references, $T_c(p)$ and $T_c(p+1)$, and the measured output power $P_M$ (block 228). In one exemplary embodiment, IF circuit 167 may compute the interpolation factor according to:

$$IF = \frac{P_M - T_c(p)}{T_c(p+1) - T_c(p)} \quad (1)$$

Figure 8:
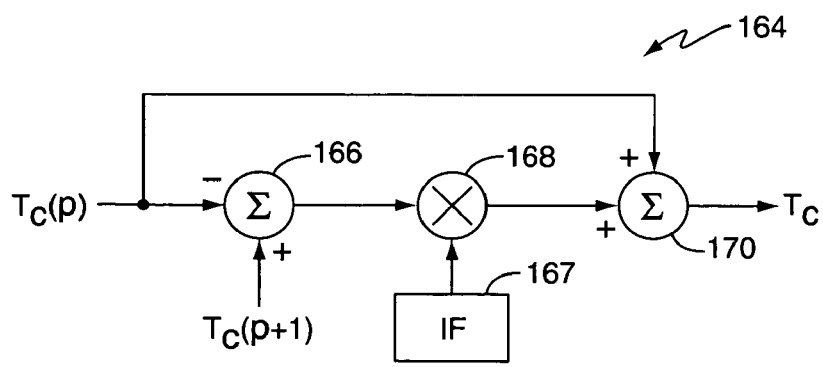
FIG. 8 illustrates a block diagram of one exemplary interpolation circuit for the amplification system of FIG. 1.

After computing the interpolation factor, interpolation circuit 164 determines the closed-loop reference $T_c$ (block 229), which is a function of the interpolation factor, IF, and the selected closed-loop references, $T_c(p)$ and $T_c(p+1)$. For the embodiment of FIG. 4A, $T_c$ then becomes equal to the measured power $P_M$. To that end, interpolation circuit 164 may comprise combiners 166 and 170, and multiplier 168, as shown in FIG. 8. Multiplier 168 applies the calculated interpolation factor to a difference between the two selected closed-loop references, $T_c(p)$ and $T_c(p+1)$, computed by combiner 166. Combiner 170 then combines the output of multiplier 168 with $T_c(p)$ to determine the closed-loop reference $T_c$.

It will be appreciated that interpolation circuit 164 is not limited to the above-described embodiment. For example, interpolation circuit 164 may apply the computed interpolation factor directly to the closed-loop reference $T_c$, independent of $T_c(p+1)$. Alternatively, IF circuit 167 may compute a negative interpolation factor for the larger closed-loop reference $T_c(p+1)$ and determine the closed-loop reference $T_c$ as a function of $T_c(p+1)$ and the interpolation factor.

After completing the transition from open-loop to closed-loop power control, closed-loop controller 132 continues to compute the difference between the measured power $P_M$ and the adjusted closed-loop reference $T_c$ to generate the closed-loop gain adjustment values $G_c$. According to one exemplary embodiment of the present invention, interpolation circuit 164 uses the same interpolation factor calculated during the transition for the duration of that particular closed-loop mode. As such, each time processor 160 selects a new closed-loop reference responsive to a power control command, interpolation circuit applies the same interpolation factor to the selected closed-loop reference. However, it will be appreciated that new interpolation factors may be calculated during closed-loop power control responsive to new power control commands.

The above discusses a solution for the discontinuities incurred when transitioning from open-loop to closed-loop power control. However, as previously discussed, the discontinuities may also occur when transitioning from closed-loop to open-loop power control. To address this, the present invention also adjusts a closed-loop gain control signal generated before the transition from closed-loop to open-loop power control based on an open-loop gain adjustment value generated after the transition, as illustrated by the exemplary procedure 300 shown in FIG. 9. During closed-loop operations, processor 160 loads an open-loop reference, selected based on the current power control command, into delay 142 of open-loop controller 140. Right before the transition from closed-loop to open-loop power control, open-loop controller 140 generates the open-loop gain adjustment value $G_o$ based on a difference between the current open-loop reference, selected based on a new power control command, and the previous open-loop reference in delay 142 (block 310). During the transition, gain controller 150 generates the new open-loop gain control signal by applying the open-loop gain adjustment value $G_o$ to a closed-loop gain control signal generated before the switch from closed-loop to open-loop power control (block 320). Gain controller 150 then controls the gain of the variable gain amplifier 112 based on the new open-loop gain control signal $A_G$ (block 330) after the switch from closed-loop to open-loop power control.

Figure 9:
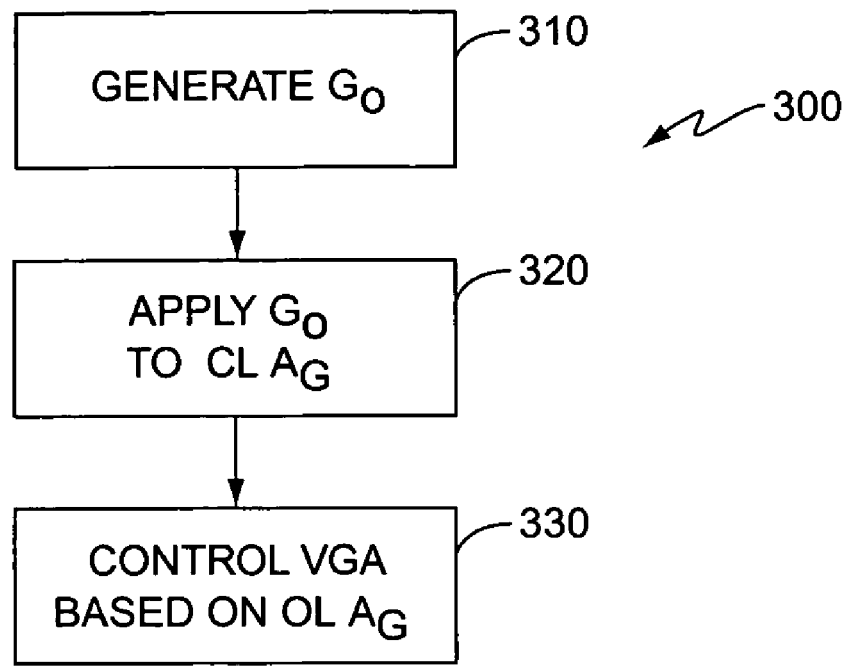
FIG. 9 illustrates a method of controlling the amplifier circuit according to one exemplary embodiment of the present invention.
Figure 10:
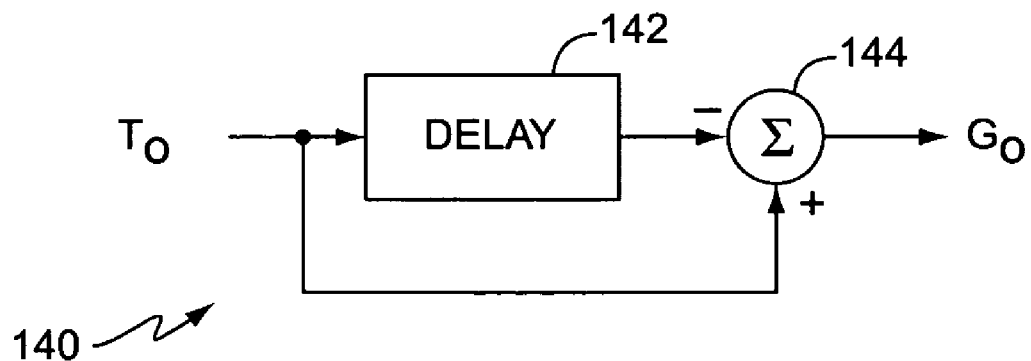
FIG. 10 illustrates a block diagram of one exemplary open-loop controller for the amplification system of FIG. 1.

Open-loop controller 140 for implementing the method of FIG. 9 may comprise a delay 142 and a combiner 144, as shown in FIG. 10. When switching from closed-loop to open-loop power control, combiner 144 subtracts a previous open-loop reference stored in delay 142 from the new open-loop reference selected from the look-up table 162 based on the step down power control command. In addition, open-loop controller 140 stores the new open-loop reference in delay 142 after computing the difference.

In the described exemplary embodiment, the open-loop reference comprises a digitized VGA value. As such, the difference provided by combiner 144 represents a digitized VGA open-loop gain adjustment value $G_o$. According to an alternate embodiment, the open-loop references may represent reference power levels. According to this alternate embodiment, combiner 144 generates a power difference between a previous power level stored in delay 142 and the new open-loop reference power level selected from look-up table 162. For this embodiment, FIG. 10 would also include a VGA converter (not shown) to map the power difference from combiner 144 to a digitized VGA value to generate the digitized VGA open-loop gain adjustment value $G_o$.

After switching from closed-loop to open-loop power control, combiner 154 in gain controller 150 combines the open-loop gain adjustment value with the previous closed-loop gain control signal stored in register 156 to generate the new digitized open-loop gain control signal. If the variable gain amplifier 112 is controlled by an analog gain control signal, optional DAC 158 converts the digitized open-loop gain control signal to an analog gain control signal, and provides the analog gain control signal to the amplifier circuit 110.

After completing the transition from closed-loop to open-loop power control, open-loop controller 140 continues to generate open-loop gain adjustment values as the difference between a previous open-loop reference stored in delay 142 and a new open-loop reference selected from look-up table 162 based on a power control command. However, once the transition is complete, gain controller 150 adjusts the open-loop gain control signal stored in register 156 based on the open-loop gain adjustment value $G_o$.

Figure 11A:
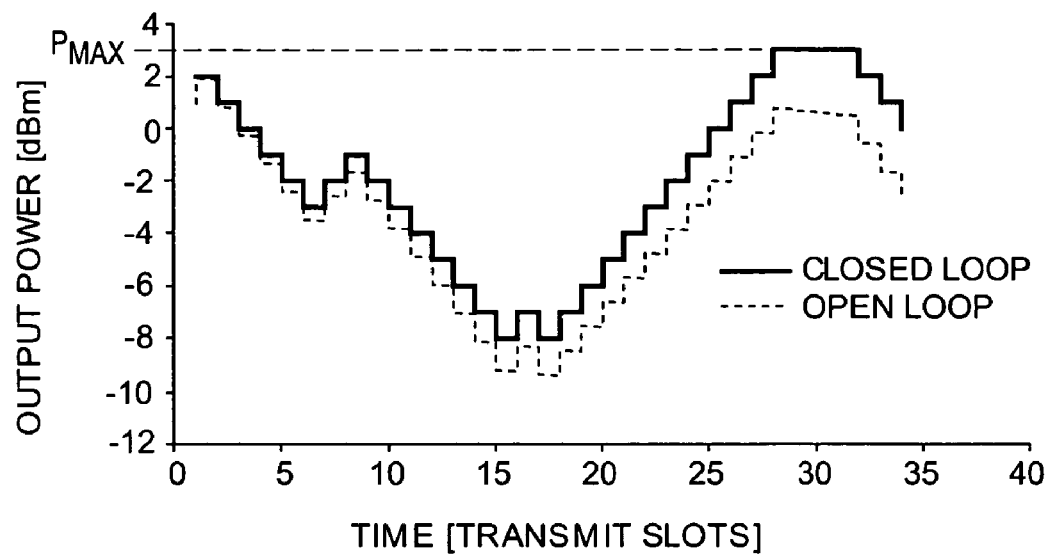
FIGS. 11A and 11B illustrate a comparison between closed-loop power control performance and open-loop power control performance.
Figure 11B:
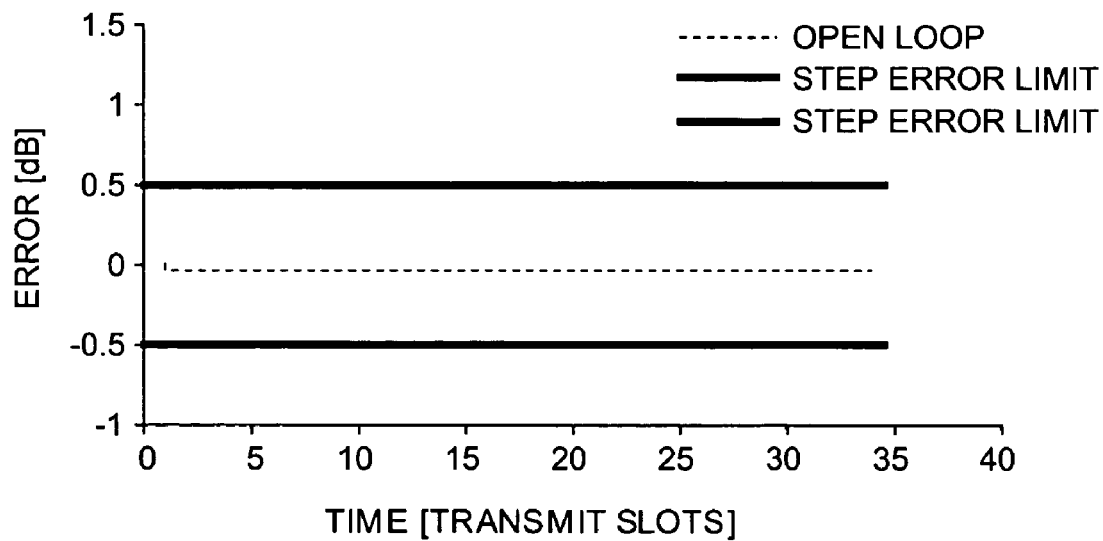

FIGS. 11A and 11B compare the performance of pure closed-loop power control to pure open-loop power control. As illustrated by the dashed line in FIG. 11A, the inability of open-loop power control to track the absolute power prevents the open-loop power control from meeting absolute power requirements. However, open-loop power control easily meets the relative power requirements, as shown by the dashed line in FIG. 11B.

Figure 12A:
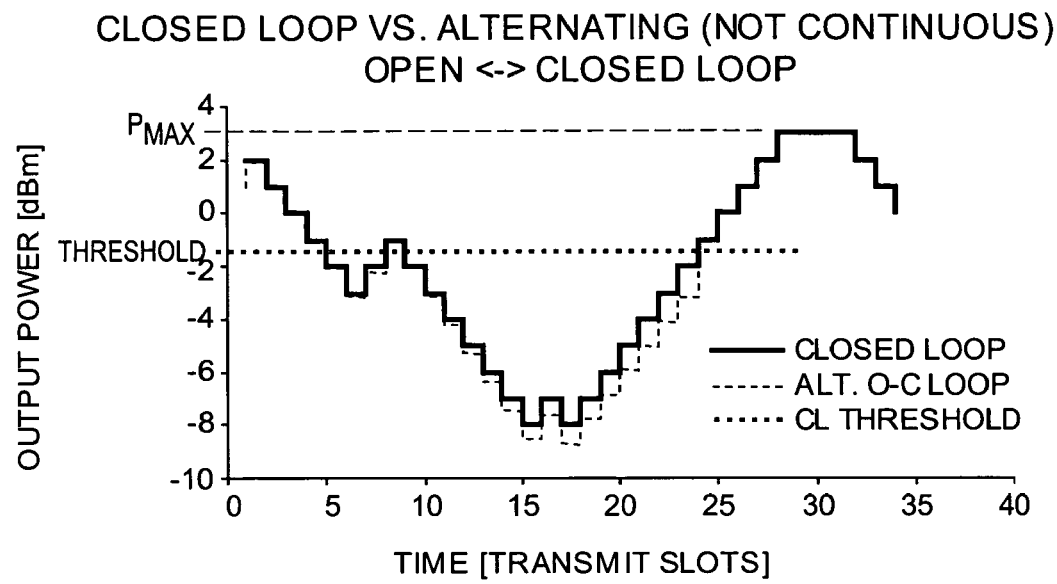
FIGS. 12A and 12B illustrate a comparison between closed-loop power control performance and the performance of a discontinuous open-loop/closed-loop power control system.
Figure 12B:
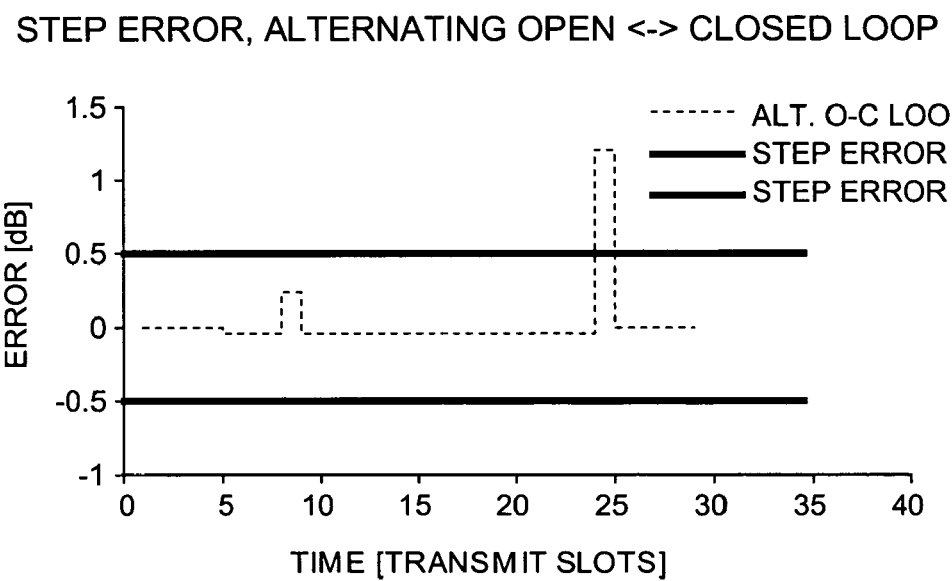

FIGS. 12A and 12B compare the conventional discontinuous open-loop/closed-loop power control to pure closed-loop power control. FIG. 12A shows that by switching from open-loop to closed-loop when the output power level meets or exceeds a predetermined threshold, the conventional open-loop/closed-loop power control meets the absolute power requirements. However, as shown by the dashed line in FIG. 12B, the closed-loop power control automatically locks to the look-up table power after the switch from open-loop to closed-loop around time slot 24 without considering the output power measured before the switch. Because the look-up table value used to control the gain of variable gain amplifier 112 is based on the power control command $P_c$, the look-up table value may significantly differ from the output power measured before the switch. As a result, the power difference before and after the switch may violate the accuracy of the relative power steps, as shown in FIG. 12B.

Figure 13A:
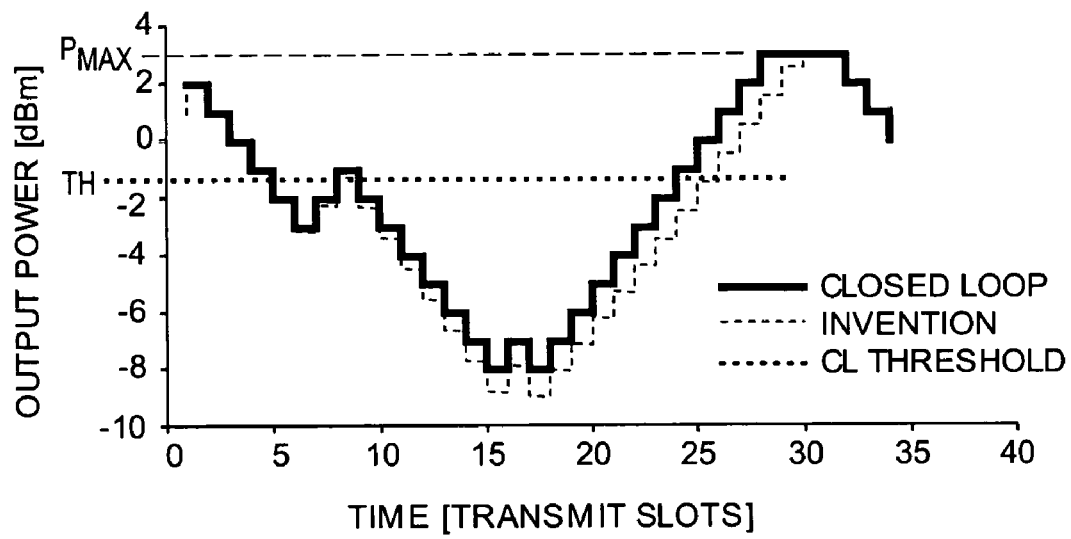
FIGS. 13A and 13B illustrate a comparison between closed-loop power control performance and the performance of a continuous open-loop/closed-loop continuous power control system according to the present invention.
Figure 13B:
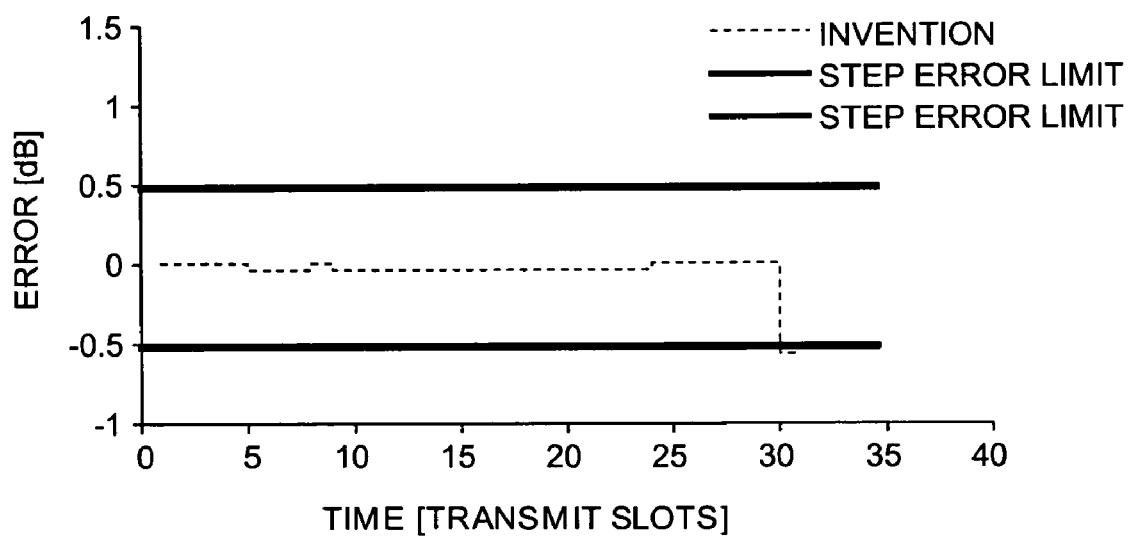

The present invention stays within the relative power accuracy requirements, as shown in FIGS. 13A and 13B. FIGS. 13A and 13B show that by adapting the reference selected from the look-up table before the switch from open-loop to closed-loop, the relative accuracy is preserved when switching from open-loop to closed-loop (see dashed line in FIG. 13B). The only time this accuracy is not maintained is when the selected closed-loop reference corresponds to a maximum look-up table value. However, as discussed above, most specifications do not maintain the relative accuracy requirements when stepping to the minimum or maximum power level. As such, this situation does not violate the requirements.

The above-described invention includes many advantages over the prior art. First, the present invention applies closed-loop power control at high powers and open-loop power control at low powers without experiencing the transitional discontinuities suffered by the prior art. Second, the implementation of the present invention makes it possible to use a power detector with a limited dynamic range and still comply with relative power accuracy requirements over a specified output power range. Further, the implementation of the present invention is very flexible because the present invention may be implemented in hardware, software, or a combination of hardware and software. Further still, it will be appreciated that the present invention may be implemented by software in a fast processing unit, which provides a flexible interface and realization.

In addition, because power control circuit 130 is implemented in the digital domain, the hardware used to implement the power control circuit 130 does not depend on a custom analog ASIC (Application Specific Integrated Circuit), thus opens the choice for a plurality of non-custom ASICs. Further, the hardware may take advantage of cost and power consumption improvements as digital hardware technology advances. Further, the digital implementation may provide for lower current consumption than analog equivalents and allows flexibility in combining the open-loop and closed-loop power steps with other control signals synchronized with power control.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of continuously controlling a gain of an amplifier circuit comprising a variable gain amplifier while switching between an open-loop power control and a closed-loop power control, the method comprising:
   measuring an output power of the amplifier circuit during open-loop power control;
   adjusting a closed-loop reference based on the measured output power to generate an adjusted closed-loop reference; and
   after switching from open-loop power control to closed-loop power control, controlling the gain of the amplifier circuit based on the adjusted closed-loop reference.

2. The method of claim 1 wherein adjusting the closed-loop reference comprises selecting the closed-loop reference from a look-up table based on the measured output power to generate a selected closed-loop reference.

3. The method of claim 2 wherein adjusting the closed-loop reference further comprises:
   generating an interpolation factor based on the measured output power and the selected closed-loop reference; and
   applying the interpolation factor to the selected closed-loop reference to generate the adjusted closed-loop reference.

4. The method of claim 1 further comprising controlling a gain of the variable gain amplifier based on an open-loop reference during open-loop power control.

5. The method of claim 1 further comprising:
   determining an open-loop gain adjustment value based on a difference between a current open-loop reference and a previous open-loop reference; and
   adjusting a gain control signal based on the gain adjustment value.

6. The method of claim 1 further comprising selecting an open-loop reference and a closed-loop reference from a look-up table based on a power control command.

7. The method of claim 6 further comprising switching from open-loop power control to closed-loop power control based on the location of the selected closed-loop reference in the look-up table.

8. The method of claim 1 further comprising switching from open-loop power control to closed-loop power control when the measured output power meets or exceeds a predetermined threshold.

9. An amplification system comprising:
   an amplifier circuit including a variable gain amplifier;
   a detection circuit configured to measure an output power of the amplifier circuit; and
   a power control circuit operable in both an open-loop and a closed-loop power control mode to control the gain of the variable gain amplifier based on a closed-loop or open-loop reference, said power control circuit configured to determine the closed-loop reference when switching from open-loop power control to closed-loop power control based on the output power measured by the detection circuit before the switch.

10. The amplification system of claim 9 wherein the power control circuit comprises a look-up table configured to store a plurality of open-loop and closed-loop references.

11. The amplification system of claim 10 wherein the power control circuit is configured to determine the closed-loop reference by selecting the closed-loop reference from the look-up table based on the measured output power.

12. The amplification system of claim 11 wherein the power control circuit comprises an interpolation circuit configured to determine the closed-loop reference by interpolating the closed-loop reference selected from the look-up table based on the measured output power.

13. The amplification system of claim 12 wherein the interpolation circuit is further configured to generate an interpolation factor based on the measured output power and the selected closed-loop reference, and wherein the interpolation circuit is configured to apply the interpolation factor to the selected closed-loop reference to determine the closed-loop reference.

14. The amplification system of claim 11 wherein the power control circuit is configured to select one of an open-loop reference and a closed-loop reference based on a power control command, and wherein the power control circuit is further configured to switch from open-loop power control to closed-loop power control based on the location of the selected closed-loop reference within the look-up table.

15. The amplification system of claim 9 wherein the power control circuit is further configured to control the gain of the variable gain amplifier during open-loop power control based on an open-loop reference.

16. The amplification system of claim 9 wherein the power control circuit is further configured to determine a gain adjustment value based on a difference between a current open-loop reference and a previous open-loop reference.

17. The amplification system of claim 16 wherein the power control circuit is further configured to adjust a gain control signal based on the gain adjustment value.

18. The amplification system of claim 9 wherein the power control circuit is further configured to switch from open-loop power control to closed-loop power control when the measured output power meets or exceeds a predetermined threshold.

19. The amplification system of claim 9 wherein the amplification system is disposed in a wireless transmitter for use in a wireless communication system.

20. A method of continuously controlling a gain of an amplifier circuit comprising:
    determining an open-loop gain adjustment value based on a difference between a current open-loop reference and a previous open-loop reference; and
    adjusting a gain control signal based on the open-loop gain adjustment value.

21. The method of claim 20 wherein adjusting the gain control signal comprises adding the gain adjustment value to a previous gain control signal to generate a new gain control signal.

22. The method of claim 21 wherein the previous gain control signal comprises a gain control signal determined before a switch from closed-loop power control to open-loop power control.

23. The method of claim 20 further comprising selecting the current open-loop reference from a look-up table based on a current power control command.

24. The method of claim 20 further comprising storing the previous open-loop reference in a delay memory, wherein the previous open-loop reference is selected from the look-up table based on a previous power control command.

25. The method of claim 20 further comprising:
    measuring an output power of the amplifier circuit during open-loop power control;
    adjusting a closed-loop reference based on the measured output power to generate an adjusted closed-loop reference; and
    after switching from open-loop power control to closed-loop power control, controlling the gain of the amplifier circuit based on the adjusted closed-loop reference.

26. An amplification system comprising:
    an amplifier circuit including at least one variable gain amplifier;
    a power control circuit configured to determine an open-loop gain adjustment value based on a difference between a current open-loop reference and a previous open-loop reference, and further configured to adjust a gain control signal based on the open-loop gain adjustment value.

27. The amplification system of claim 26 wherein the power control circuit comprises a combiner configured to add the gain adjustment value to a previous gain control signal to generate a new gain control signal.

28. The amplification system of claim 27 wherein the previous gain control signal comprises a gain control signal determined before a switch from closed-loop power control to open-loop power control.

29. The amplification system of claim 26 wherein the power control circuit comprises a look-up table configured to store a plurality of open-loop references and closed-loop references.

30. The amplification system of claim 29 wherein the power control circuit is configured to select the current and previous open-loop references based on current and previous power control commands, respectively.

31. The amplification system of claim 26 further comprising a detection circuit configured to measure an output power of the amplifier circuit.

32. The amplification system of claim 31 wherein the power control circuit is further configured to adjust the closed-loop reference when switching from open-loop power control to closed-loop power control based on the output power measured by the detection circuit.

33. The amplification system of claim 26 wherein the amplification system is disposed in a wireless transmitter for use in a wireless communication system.

* * * * *